United States Patent
Koyama

(10) Patent No.: US 7,162,268 B2
(45) Date of Patent: Jan. 9, 2007

(54) PORTABLE TERMINAL WITH DISPLAY CAPABILITY BASED ON TILT ANGLE

(75) Inventor: Yukio Koyama, Tokyo (JP)

(73) Assignee: NEC Corporation, Tokyo (JP)

(*) Notice: Subject to any disclaimer, the term of this patent is extended or adjusted under 35 U.S.C. 154(b) by 499 days.

(21) Appl. No.: 10/287,704

(22) Filed: Nov. 5, 2002

(65) Prior Publication Data
US 2003/0087669 A1 May 8, 2003

(30) Foreign Application Priority Data
Nov. 6, 2001 (JP) ............... 2001-340916

(51) Int. Cl.
H04B 7/00 (2006.01)
H04B 1/06 (2006.01)
H04M 1/00 (2006.01)

(52) U.S. Cl. .......... 455/556.1; 455/344; 455/66.1; 455/557; 455/566

(58) Field of Classification Search .......... 455/556.1, 455/556.2, 557, 566, 344, 66.1
See application file for complete search history.

(56) References Cited

U.S. PATENT DOCUMENTS 4,796,019 A 1/1989 Auerbach
5,602,566 A * 2/1997 Motosyuku et al. ........ 345/684

FOREIGN PATENT DOCUMENTS

| EP | 0 587 161 A2 | 3/1994 |
|---|---|---|
| EP | 0 825 514 A2 | 2/1998 |
| JP | 07-307776 A | 11/1995 |
| JP | H09-198177 A | 7/1997 |
| JP | 10-49290 A | 2/1998 |
| JP | 10-200618 * | 7/1998 |
| JP | H10-200618 A | 7/1998 |
| JP | 11-075240 A | 3/1999 |
| JP | 2000-222103 A | 8/2000 |
| JP | 2002-062964 A | 2/2002 |
| JP | 2002-278671 A | 9/2002 |

* cited by examiner

Primary Examiner—Edan Orgad
(74) Attorney, Agent, or Firm—Sughrue Mion, PLLC

(57) ABSTRACT

A detecting unit 5a detects the slope of a portable terminal 10. An input key 4 includes a plurality of keys. A control unit 3 generates a code C based on the slope of the portable telephone terminal 10 as detected by the slope detecting unit for displaying a pattern corresponding to the generated code C on a display unit 6.

6 Claims, 3 Drawing Sheets

| SLOPE | 1-ST SUB-CODE 1SC |
|---|---|
| 0~90° | 1SC-1 |
| 90~180° | 1SC-2 |
| 180~270° | 1SC-3 |
| 270~360° | 1SC-4 |

PORTABLE TERMINAL WITH DISPLAY CAPABILITY BASED ON TILT ANGLE

BACKGROUND OF THE INVENTION

This application claims benefit of Japanese Patent Application No. 2001-340916 filed on Nov. 6, 2001, the contents of which are incorporated by the reference.

The present invention relates to portable terminals and, more particularly, to portable terminals capable of reduction of input keys necessary for input operation with respect to them.

A technique concerning data processing system and method is disclosed in Japanese Patent Laid-Open No. 10-49290.

In this prior art technique, an input unit, which is accommodated in a housing having a predetermined size and serves to input data, comprises a display means for displaying data, a detecting means for detecting the posture displacement of the housing with rotation thereof as a whole, and an instructing means for providing predetermined instructions. The input unit further comprises a processing means for executing predetermined processing based on an instruction from the instructing means and detected displacement data from the detecting means. The input unit further comprises a storing means for storing data and a position detecting means for detecting the present position.

The housing is of such a size that it can be held with a single hand. The detecting means detects rotational speeds in the third and second axial directions.

SUMMARY OF THE INVENTION

An object of the present invention is to provide a portable terminal with a greater number of functions and a less number of keys (or key LEDs) compared to the prior art portable terminal capable of suppressing current consumption necessary for inputting operation.

Now, means for solving problems will be described by using reference numerals and symbols, which are provided for clarifying the correspondence relation between the description of the "claims" and the description of the "embodiments of the present invention but should not be used for the understanding of the technical scope of the present invention as set forth in the "claims".

According to an aspect of the present invention, there is provided a portable terminal (10) comprising: a detecting unit (5a) for detecting the slope of the portable terminal; a display unit (6); an input unit (4) having a plurality of keys; and a control unit (3) for generating a code (C) based on the slope (2DB-a) of the portable terminal (10) detected by the slope detecting unit (5a) and an operated key among the plurality of keys for displaying a pattern corresponding to the generated code on the display unit (6).

The portable terminal further comprises a code conversion table (CT) for storing a code (C) corresponding to the combination of a 1-st sub-code representing the slope of the portable terminal (10) and a 2-nd sub-code (2SC) representing the operated key, the control unit (3) being operative to generate the code based on the combination of the 1-st and 2-nd sub-codes (1SC), (2SC) with reference to the code conversion table (CT).

According to another aspect of the present invention, there is provided a portable terminal comprising: a slope detecting unit (5a) for detecting the slope of the portable terminal; a display unit (6); a plurality of conversion tables (CT); and a control unit (3) for generating an output code (C) based on the slope of the portable terminal (10) detected by the slope detecting unit (5a) and an input code train (2SC) and by using the plurality of code conversion tables (CT) for displaying a pattern corresponding to the generated output code train on the display unit (6).

The control unit specifies one of the plurality of conversion tables (CT) based on the slope of the portable terminal detected by the slope detecting unit (5a), and converts the input code train (2SC) to the output code train (C) with reference to the specified conversion table (CT).

The portable terminal further comprises an input unit (4) having a plurality of keys and the control unit (3) being operative to generate a code (C) based on the slope (2DB-a) of the portable terminal (10) detected by the slope detecting unit (5a) and an operated key among the plurality of keys for generating a pattern corresponding to the generated code on the display unit (6).

The portable terminal further comprises a code conversion table (CT) for storing a code (C) corresponding to a 1-st sub-code (1SC) representing the slope of the portable terminal (10) and a 2-nd sub-code (2SC) representing the operated key, the control unit (3) being operative to generate the code based on the combination of the 1-st and 2-nd sub-codes (1SC), (2SC) with reference to the code conversion table (CT).

According to other aspect of the present invention, there is provided a portable terminal comprising: a detecting unit (5b) for detecting the position relation between one end (A) and the other end (B) of the portable terminal (10); a display unit (6); an input unit (4) having a plurality of keys; and a control unit (3) for generating a code (C) based on the position relation detected by the detecting unit (5b) and an operated key among the plurality of keys for displaying a pattern corresponding to the generated code on the display unit (6).

The portable terminal further comprises a code conversion table (CT) for storing a code (C) corresponding to the combination of a 1-st sub-code (1SC) representing the position relation between one end (A) and the other end (B) of the portable terminal (10) and a 2-nd sub-code (2SC) representing the operated key, the control unit (3) being operative to generate the code (C) based on the combination of the 1-st and 2-nd sub-codes (1SC), (2SC) with reference to the code conversion table (CT).

According to still other aspect of the present invention, there is provided a portable terminal comprising: a detecting unit (5b) for detecting the position relation between one end (A) and the other end (B) of the portable terminal (10); a display unit (6); a plurality of conversion tables (CT); and a control unit (3) for generating an output code based on the position relation detected by the detecting unit (5b) and an input code train (2SC) and by using the plurality of code conversion tables (CT) for displaying a pattern corresponding to the generated output code train on the display unit (6).

The control unit (3) specifies one of the plurality of conversion tables (CT) based on the position relation detected by the detecting unit (5b), and converts the input code train (2SC) to the output code train (C) with reference to the specified conversion table (CT).

The portable terminal further comprises an input unit (4) having a plurality of keys, the control unit (3) being operative to generate a code (C) based on the position relation detected by the detecting unit (5b) and an operated key among the plurality of keys for generating a pattern corresponding to the generated code (C) on the display unit (6).

The portable terminal further comprises a code conversion table for storing a code corresponding to a 1-st sub-code (1SC) representing the position relation of the portable terminal (10) and a 2-nd sub-code (2SC) representing the operated key, the control unit (3) being operative to generate the code (C) based on the combination of the 1-st and 2-nd sub-codes (1SC), (2SC) with reference to the code conversion table (CT).

Other objects and features will be clarified from the following description with reference to attached drawings.

PREFERRED EMBODIMENTS OF THE INVENTION

Preferred embodiments of the present invention will now be described with reference to the drawings.

Figures 1, 2:
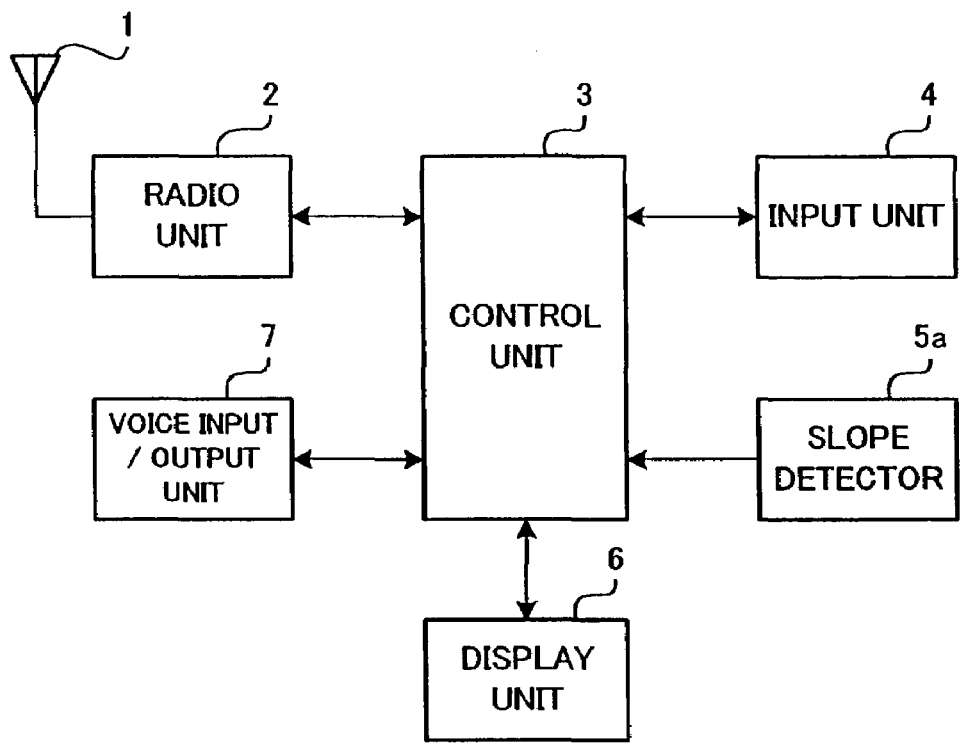
FIG. 1 is a block diagram showing a portable terminal according to a first embodiment of the present invention.
FIG. 2 shows data stored in a first database in the portable terminal.

FIG. 1 is a block diagram showing a portable telephone set 10 as a portable terminal according to the present invention. This portable telephone set 10 comprises a transceiver unit 1, a radio unit 2, a control unit 3, an input unit 4, a slope detector 5a, a display unit 6 and a voice input/output unit 7.

The transceiver unit 1 is an interface part (i.e., antenna) between a base station and the portable telephone set 10 contained in a radio public network. The transceiver unit 1 transmits a signal received from the radio unit 2 to a base station.

The radio unit 2 transmits a signal transmitted from the control unit 3 to the transceiver unit 1. When the radio unit 2 receives a signal from the base station via the transceiver unit 1, it transmits this signal to the control unit 3.

The control unit 3 receives a first sub-code 1SC representing a slope 2DB-a from the slope detector 5a, and also receives a second-code 25C representing a key operated by a user of the portable telephone set 10 from the input unit 4. The control unit 3 generates a code C from the first and second sub-codes 1SC and 2SC.

The control unit 3 has a group of code conversion tables CT as shown in FIG. 2. The code conversion tables CT are classified into a 1-st, a 2-nd and a 3-rd conversion table 1CT, 2CT and 3CT, which all store the same elements as those shown in FIG. 2. The classification is made for every 1-st sub-code 1SC.

In the code conversion tables CT are stored the 1-st and 2-nd sub-codes 1SC and 2SC and a code C which is generated based on the combination of the 1-st and 2-nd sub-codes 1SC and 2SC. When the control unit 3 receives the 1-st and 2-nd sub-codes 1SC and 2SC, it specifies one of a plurality of code conversion tables CT on the basis of the 1-st sub-code 1SC. The control unit 3 also converts the 2-nd sub-code 2SC to the code C with reference to the specified code conversion table CT and the received 1-st sub-code 1SC. The control unit 3 further outputs a pattern obtained as a result of the conversion to the display unit 6.

The input unit 4 is constituted by input keys (i.e., push-buttons having number displays), which are used at the time of data input by the user of the portable telephone set 10. Input numbers (i.e., numerals, #, etc.) are assigned to the input keys. When the user executes an input operation on the input keys, the 2-nd sub-code 2SC corresponding to an input number is transmitted to the control unit 3.

Figures 3, 4:
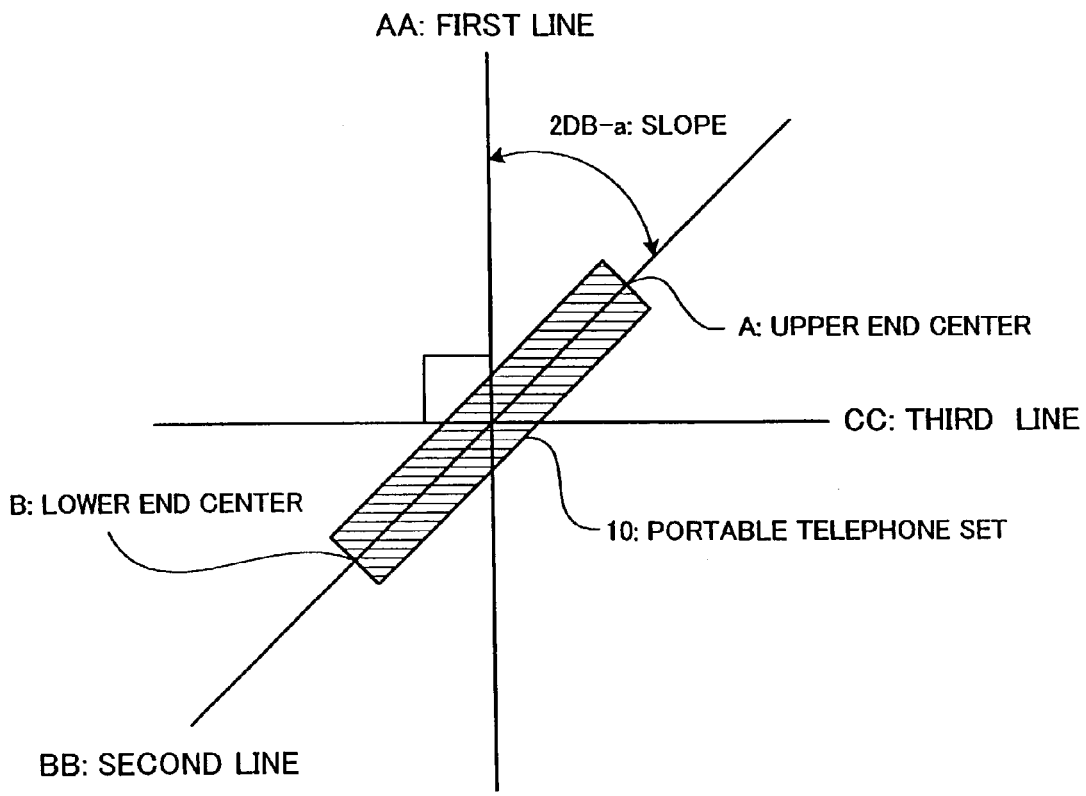
FIG. 3 is a view showing a method of detecting the slope the slope detector in the portable terminal.
FIG. 4 shows data stored in a second database in the portable terminal.

The slope detector 5a detects the slope 2DB-a of the portable telephone set 10. FIG. 3 is a view showing a method of detecting the slope 2DB-a by the slope detector 5a. The detection method will now be described with reference to the Figure. A first and a second lines AA and CC are in the same plane and perpendicularly cross each other. The slope detector 5a detects the slope 2DB-a in the clockwise direction of the second line BB, which passes through the upper end center A and the lower end center B of the portable telephone set 10, with respect to the first line AA. The slope detector 5a outputs the 1-st sub-code 1SC representing the detected slope 2DB-a to the control unit 3.

The outputted 1-st sub-code 1SC can be set as shown in, for instance, FIG. 4. In FIG. 4, it is shown that the 1-st sub-code 1SC is outputted as 1SC-1 when the slope is 0 to 90 degrees (indicating that the upper end center A is found in the first quadrant), as 1SC-2 when the slope is 90 to 180 degrees (indicating that the upper end center A is in the second quadrant), and so forth.

The display unit 6 displays output data from the control unit 3. The voice input/output unit 7 outputs voice output data from the control unit 3.

Figure 5:
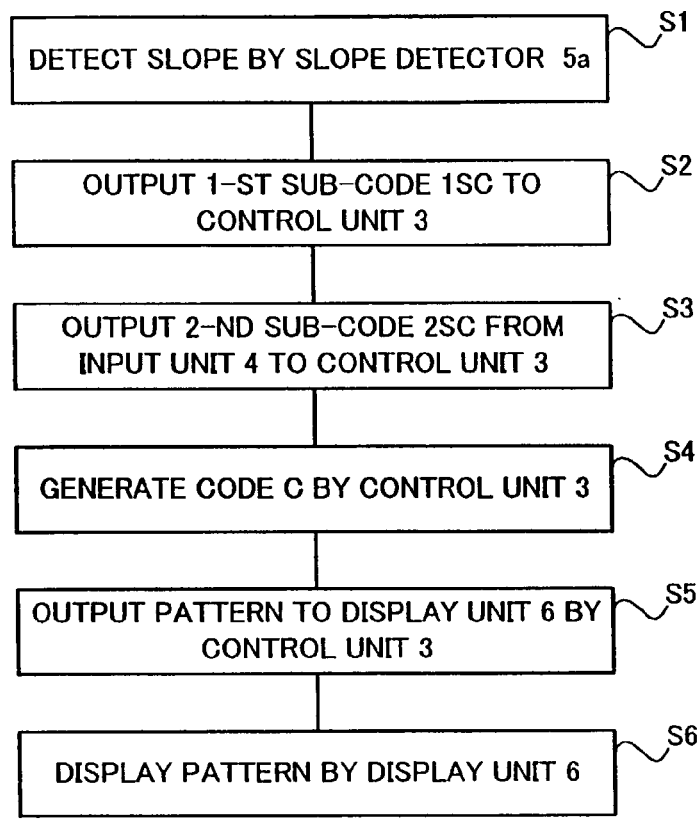
FIG. 5 is a flow chart showing processes executed in the first embodiment according to the present invention.

A process executed in the first embodiment of the portable telephone set 10 according to the present invention will be described in detail. It is assumed that the aim of the process as shown in FIG. 5 is character conversion by a dictionary function of the portable telephone set 10. The character conversion is executed with dictionary group A when the 1-st sub-code 1SC is 1SC-1, with dictionary group B when the 1-st sub-code 1SC is 1SC-2 and with dictionary group C when 1-st sub-code 1SC is 1SC-3. The dictionary group A corresponds to code train C which is contained in the 1-st code conversion table 1CT. The dictionary group B corresponds to code train C which is contained in the 2-nd code conversion table 2CT. The dictionary group C corresponds to code train C which is contained in the 3-rd code conversion table 3CT.

The slope detector 5a detects the slope of the second line BB with respect to the first line AA (step S1). The slope detector 5a outputs the 1-st sub-code 1SC representing the check result to the control unit 3 (step S2). When the user of the portable telephone set 10 executes an input operation, the 2-nd sub-code 2SC corresponding to the operated key is outputted from the input unit 4 to the control unit 3 (step S3).

It is hereinunder assumed that the 1-st sub-code 1SC is outputted to the control unit 3 in the step S2, when it is 1SC-3.

The control unit 3 refers to the 3-rd code conversion table 3CT, and generates code C (i.e., result of conversion using the dictionary group C of the 2-nd sub-code 2SC) from the 1-st and 2-nd sub-codes 1SC (1SC-3) and 2SC (step S4). The control unit 3 outputs a pattern corresponding to the code C generated in the step S4 to the display unit 6 (step S5). The display unit 6 displays the pattern outputted from the control unit on itself (step S6).

Figure 6:
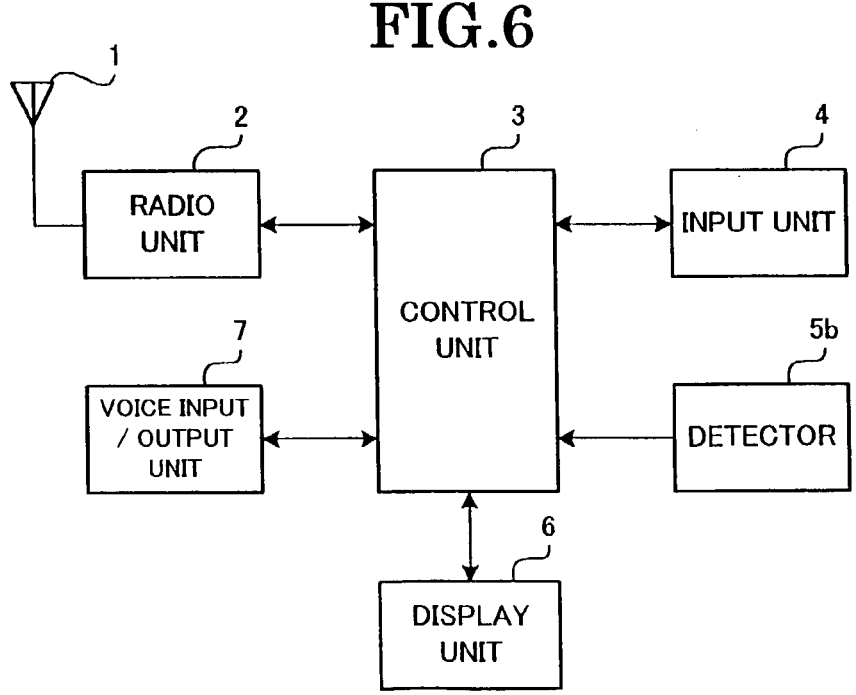
FIG. 6 is a block diagram showing a second embodiment of the portable terminal according to a second embodiment of the present invention

FIG. 6 is a block diagram showing a second embodiment of the portable telephone set according to the present invention. In FIG. 6, unlike the case of FIG. 1, a detector 5b is provided in lieu of the slope detector 5*a*. The detector 5*b*, unlike the slope detector 5*a*, detects the position relation between the upper end center A and the lower end center B of the portable telephone set 10. The second embodiment is the same as the first embodiment except for that the 1-st sub-code represents the position relation between the upper end center A and the lower end center B of the portable telephone set 10.

The method of the position relation detection is the same as shown in FIG. 3. However, unlike the first embodiment, the first line AA in FIG. 3 extends in the perpendicular direction to the plane, in which the third line CC extends. Thus, in the second embodiment the slope 2DB-a represent the (three-dimensional) position relation between the upper end center A and the lower end center B. The 1-st sub-code 1SC which is based on the (three-dimensional) position relation, is outputted from the detector 5*b* to the control unit 3.

The portable telephone set according to the present invention, can provide a greater number of functions with a less number of keys (key LEDs) compared to the prior art portable telephone set, and thus it can suppress current consumption which is necessary at the time of the input operation.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable terminal comprising:
   a detecting unit for detecting the slope of the portable terminal;
   a display unit;
   an input unit having a plurality of keys;
   a control unit for generating a code based on the slope of the portable terminal detected by the slope detecting unit and an operated key among the plurality of keys for displaying a pattern corresponding to the generated code on the display unit;
   a code conversion table for storing a code corresponding to the combination of a 1-st sub-code representing the slope of the portable terminal and a 2-nd sub-code representing the operated key; and
   the control unit being operative to generate the code based on the combination of the 1-st and 2-nd sub-codes with reference to the code conversion table.

2. A portable terminal comprising:
   a slope detecting unit for detecting the slope of the portable terminal;
   a display unit;
   a plurality of conversion tables;
   a control unit for generating an output code based on the slope of the portable terminal detected by the slope detecting unit and an input code train and by using the plurality of code conversion tables for displaying a pattern corresponding to the generated output code train on the display unit;
   an input unit having a plurality of keys;
   the control unit being operative to generate a code based on the slope of the portable terminal detected by the slope detecting unit and an operated key among the plurality of keys for generating a pattern corresponding to the generated code on the display unit;
   a code conversion table for storing a code corresponding to a 1-st sub-code representing the slope of the portable terminal and a 2-nd sub-code representing the operated key; and
   the control unit being operative to generate the code based on the combination of the 1-st and 2-nd sub-codes with reference to the code conversion table.

3. A portable terminal comprising:
   a detecting unit for detecting the position relation between one end and the other end of the portable terminal;
   a display unit;
   an input unit having a plurality of keys;
   a control unit for generating a code based on the position relation detected by the detecting unit and an operated key among the plurality of keys for displaying a pattern corresponding to the generated code on the display unit; and
   a code conversion table for storing a code corresponding to the combination of a 1-st sub-code representing the position relation between one end and the other end of the portable terminal and a 2-nd sub-code representing the operated key and the control unit being operative to generate the code based on the combination of the 1-st and 2-nd sub-codes with reference to the code conversion table.

4. A portable terminal comprising:
   a detecting unit for detecting the position relation between one end and the other end of the portable terminal;
   a display unit;
   a plurality of conversion tables; and
   a control unit for generating an output code based on the position relation detected by the detecting unit and an input code train and by using the plurality of code conversion tables for displaying a pattern corresponding to the generated output code train on the display unit;
   a code conversion table for storing a code corresponding to a 1-st sub-code representing the position relation of the portable terminal and a 2-nd sub-code representing the operated key; and
   the control unit being operative to generate the code based on the combination of the 1-st and 2-nd sub-codes with reference to the code conversion table.

5. The portable terminal according to claim 2, wherein:
   the control unit specifies one of the plurality of conversion tables based on the slope of the portable terminal as detected by the slope detecting unit, and converts the input code train to the output code train with reference to the specified conversion table.

6. The portable terminal according to claim 4, wherein:
   the control unit specifies one of the plurality of conversion tables based on the position relation detected by the slope detecting unit, and converts the input code train to the output code train with reference to the specified conversion table.

* * * * *